United States Patent
Kaneko

(10) Patent No.: US 10,019,792 B2
(45) Date of Patent: Jul. 10, 2018

(54) EXAMINATION DEVICE, EXAMINATION METHOD, AND COMPUTER PROGRAM PRODUCT

(71) Applicant: Hitomi Kaneko, Saitama (JP)

(72) Inventor: Hitomi Kaneko, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/458,787

(22) Filed: Mar. 14, 2017

(65) Prior Publication Data

US 2017/0270658 A1  Sep. 21, 2017

(30) Foreign Application Priority Data

Mar. 18, 2016 (JP) ................................. 2016-056133

(51) Int. Cl.
| | |
|---|---|
| *G06K 9/00* | (2006.01) |
| *G06T 7/00* | (2017.01) |
| *G06K 9/62* | (2006.01) |

(52) U.S. Cl.
CPC .......... *G06T 7/0004* (2013.01); *G06K 9/6202* (2013.01); *G06T 2207/30144* (2013.01)

(58) Field of Classification Search
None
See application file for complete search history.

(56) References Cited

U.S. PATENT DOCUMENTS

| 7,327,877 B2 * | 2/2008 | Kita ..................... H04N 1/4097 |
| | | 382/167 |
| 7,519,222 B2 * | 4/2009 | Kisilev ................. G06T 7/001 |
| | | 382/191 |
| 7,746,392 B2 * | 6/2010 | Hayaishi .............. H04N 5/3675 |
| | | 348/241 |
| 8,351,679 B2 * | 1/2013 | Fukami ................ G01N 21/954 |
| | | 348/130 |
| 8,792,128 B2 * | 7/2014 | Kitai .................... H04N 1/4092 |
| | | 347/19 |
| 9,088,745 B2 * | 7/2015 | Kitai .................... H04N 1/4092 |

(Continued)

FOREIGN PATENT DOCUMENTS

| JP | 05-162294 | 6/1993 |
| JP | 07-031134 | 4/1995 |

(Continued)

*Primary Examiner* — Soo Park
(74) *Attorney, Agent, or Firm* — Duft Bornsen & Fettig LLP

(57) ABSTRACT

An examination device includes: a second difference image generator that calculates a difference in pixel values between each pixel constituting a detection target image and a pixel located away from the each pixel by a predetermined number of pixels in a first direction, and generates a second difference image constituted of the calculated difference values; a calculator that calculates a first pixel number being the number of pixels whose pixel values are more than a first threshold value, and a second pixel number being the number of pixels whose pixel values are less than the first threshold value, out of pixels constituting each pixel column constituting a detection target area in the second difference image extending in a second direction; and a determiner that determines whether there is a line defect in the detection target area based on ratio between the first and second pixel numbers of each pixel column.

15 Claims, 12 Drawing Sheets

(56) References Cited

U.S. PATENT DOCUMENTS

| | | | |
|---|---|---|---|
| 9,098,897 B2* | 8/2015 | Kisilev | H04N 1/00092 |
| 9,390,493 B2* | 7/2016 | Kitai | G06T 7/001 |
| 9,495,736 B2* | 11/2016 | Kawabata | G06T 7/001 |
| 2005/0147287 A1* | 7/2005 | Sakai | G01N 21/9501 |
| | | | 382/141 |
| 2010/0188714 A1 | 7/2010 | Yamakawa | |
| 2010/0245442 A1* | 9/2010 | Kasai | B41J 2/2142 |
| | | | 347/14 |
| 2012/0121139 A1* | 5/2012 | Kojima | B41F 33/0036 |
| | | | 382/112 |
| 2013/0044342 A1 | 2/2013 | Kaneko et al. | |
| 2013/0044347 A1 | 2/2013 | Kitai et al. | |
| 2014/0093139 A1 | 4/2014 | Yamagishi | |
| 2014/0270397 A1 | 9/2014 | Sochi | |
| 2014/0313538 A1 | 10/2014 | Kitai et al. | |
| 2015/0243010 A1 | 8/2015 | Kaneko | |

FOREIGN PATENT DOCUMENTS

| | | |
|---|---|---|
| JP | 3313739 | 5/2002 |
| JP | 2003-094594 | 4/2003 |
| JP | 2004-195878 | 7/2004 |
| JP | 3604333 | 10/2004 |
| JP | 2005-165387 | 6/2005 |
| JP | 4301020 | 5/2009 |
| JP | 2010-151606 | 7/2010 |
| JP | 2010-165011 | 7/2010 |
| JP | 2014-071045 | 4/2014 |
| JP | 2014-199244 | 10/2014 |
| JP | 2015-094666 | 5/2015 |

\* cited by examiner

FIG.6

| | | | | 401 | | | | | | |
|---|---|---|---|---|---|---|---|---|---|---|
| 134 | 135 | 130 | 129 | 132 | 130 | 125 | 126 | 133 | 133 | 130 |
| 140 | 133 | 128 | 130 | 127 | 129 | 130 | 129 | 133 | 133 | 137 |
| 135 | 137 | 133 | 131 | 123 | 128 | 134 | 135 | 134 | 134 | 131 |
| 127 | 131 | 130 | 127 | 121 | 114 | 122 | 132 | 127 | 129 | 131 |
| 132 | 136 | 130 | 134 | 125 | 122 | 122 | 132 | 132 | 130 | 128 |
| 129 | 132 | 134 | 131 | 128 | 127 | 133 | 134 | 136 | 134 | 132 |
| 134 | 128 | 132 | 134 | 129 | 126 | 129 | 134 | 134 | 141 | 137 |
| 134 | 131 | 130 | 133 | 130 | 126 | 137 | 137 | 135 | 139 | 133 |
| 137 | 136 | 133 | 134 | 130 | 124 | 127 | 136 | 137 | 138 | 133 |
| 134 | 134 | 139 | 135 | 134 | 128 | 130 | 137 | 136 | 141 | 134 |
| 129 | 134 | 132 | 133 | 135 | 134 | 131 | 131 | 134 | 133 | 135 |
| 127 | 127 | 129 | 131 | 124 | 125 | 124 | 129 | 125 | 129 | 132 |
| 129 | 131 | 130 | 126 | 118 | 124 | 127 | 123 | 126 | 128 | 123 |
| 123 | 129 | 131 | 127 | 127 | 113 | 117 | 132 | 135 | 128 | 127 |
| 132 | 139 | 138 | 138 | 130 | 124 | 128 | 130 | 131 | 132 | 130 |
| 131 | 135 | 139 | 131 | 127 | 120 | 124 | 131 | 130 | 135 | 140 |
| 134 | 137 | 136 | 133 | 125 | 121 | 122 | 130 | 129 | 130 | 135 |
| 137 | 138 | 138 | 139 | 137 | 130 | 130 | 145 | 139 | 140 | 141 |
| 136 | 139 | 144 | 145 | 132 | 121 | 130 | 139 | 137 | 144 | 139 |
| 144 | 136 | 139 | 130 | 129 | 126 | 135 | 138 | 135 | 139 | 135 |
| 134 | 138 | 141 | 136 | 128 | 123 | 127 | 129 | 129 | 133 | 133 |
| 130 | 139 | 138 | 132 | 132 | 124 | 130 | 136 | 137 | 133 | 131 |
| 134 | 136 | 130 | 130 | 129 | 128 | 131 | 138 | 136 | 138 | 133 |
| 138 | 138 | 141 | 133 | 129 | 130 | 131 | 134 | 131 | 132 | 134 |

FIG.7

| POSITIVE VALUES | 5 | 13 | 13 | 20 | 19 | 3 | 2 | 12 | 5 | 15 |
| --- | --- | --- | --- | --- | --- | --- | --- | --- | --- | --- |
| NEGATIVE VALUES | 16 | 10 | 9 | 2 | 5 | 19 | 20 | 9 | 16 | 8 |

402

EXAMINATION DEVICE, EXAMINATION METHOD, AND COMPUTER PROGRAM PRODUCT

CROSS-REFERENCE TO RELATED APPLICATIONS

The present application claims priority under 35 U.S.C. § 119 to Japanese Patent Application No. 2016-056133, filed on Mar. 18, 2016. The contents of which are incorporated herein by reference in their entirety.

BACKGROUND OF THE INVENTION

1. Field of the Invention

The present invention relates to an examination device, an examination method, and a computer program product.

2. Description of the Related Art

In high quality printing such as production printing, quality examinations of printed matters are required. For example, there are known examination devices that detect defects present in printed matters based on read images generated by electrically reading the printed matters, to examine the quality of the printed matters based on the detected defects.

As defects present in printed matters, there are dots, lines, unevenness and the like. Since line defects are caused by scratches or dirt in drums, rollers, or the like provided in printing devices such as printers or reading devices such as scanners and often occur continuously, the line defects are thus strongly required to be detected.

For example, Japanese Unexamined Patent Application Publication No. 2014-71045 discloses a technique for detecting such line defects by performing filtering processing and the like.

By the way, since line defects are defects occurring over large areas, even low density line defects are required to be detected.

However, when detecting low density line defects by the conventional technique as described above, strong noise occurring during a printing or reading process cannot be distinguished from low density line defects, and therefore the noise may be wrongly detected as line defects.

SUMMARY OF THE INVENTION

According to one aspect of the present invention, a

An examination device includes a reference image obtaining unit, a read image obtaining unit, a first difference image generator, a second difference image generator, a calculator, and a determiner. The reference image obtaining unit obtains a reference image that is a reference of an examination of a printed matter. The read image obtaining unit obtains a read image obtained by reading the printed matter. The first difference image generator generates a first difference image that represents a difference between the reference image and the read image. The second difference image generator calculates a difference value in pixel values between each pixel constituting a detection target image, from which a line defect is to be detected, and a pixel located at a position away from the each pixel by a predetermined number of pixels in a first direction, the detection target image being at least one of the reference image, the read image, and the first difference image, and generates a second difference image constituted of the calculated difference values as pixel values. The calculator calculates a first pixel number being the number of pixels of which pixel values are more than a first threshold value, and a second pixel number being the number of pixels of which pixel values are less than the first threshold value, out of a plurality of pixels constituting each of a plurality of pixel columns that constitute a detection target area from which a line defect is to be detected in the second difference image and extend in a second direction orthogonal to the first direction. The determiner determines whether there is a line defect constituted of one or more of the pixel columns in the detection target area, based on a ratio between the first pixel number and the second pixel number of each of the pixel columns.

BRIEF DESCRIPTION OF THE DRAWINGS

FIG. 6 is an explanatory view showing an example of a first difference image according to the embodiment;

FIG. 7 is an explanatory view showing an example of a second difference image according to the embodiment;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
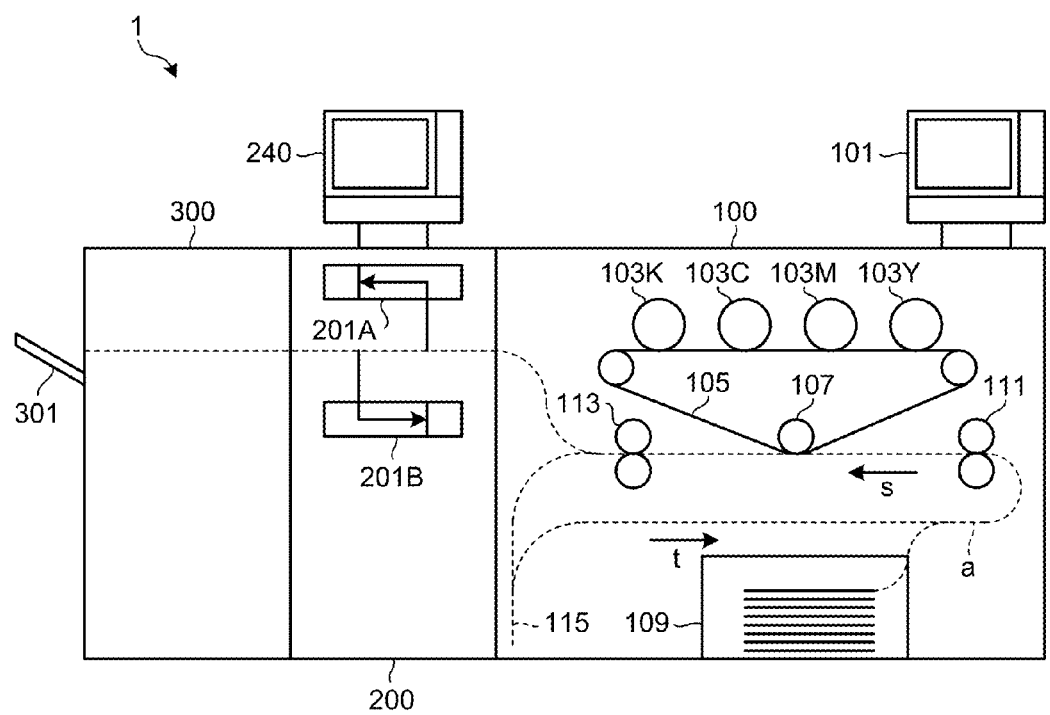
FIG. 1 is a schematic view showing an example of a printed matter examination system according an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An object of an embodiment is to provide an examination device, an examination method, and a computer program product capable of improving detection accuracy of a line defect.

Embodiments of an examination device, an examination method, and a program will be described below in detail with reference to the accompanying drawings.

FIG. 1 is a schematic view showing an example of a printed matter examination system 1 according an embodiment. As shown in FIG. 1, the printed matter examination system 1 includes a printer 100, a printed matter examination device 200 (an example of an examination device), and a stacker 300.

The printer 100 includes an operation panel 101, photosensitive drums 103Y, 103M, 103C, and 103K, a transfer belt 105, a secondary transfer roller 107, a paper feeder 109, a pair of feed rollers 111, a fixing roller 113, and an inversion path 115.

The operation panel 101 is an operation display unit through which various input operations are performed to the printer 100 and on which various screens are displayed.

On each of the photosensitive drums 103Y, 103M, 103C, and 103K, a toner image is formed in an imaging process (a charging step, an exposure step, a developing step, a transfer step, and a cleaning step). The formed toner images are transferred to the transfer belt 105. In this embodiment, a yellow toner image is formed on the photosensitive drum 103Y, a magenta toner image is formed on the photosensitive drum 103M, a cyan toner image is formed on the photosensitive drum 103C, and a black toner image is formed on the photosensitive drum 103K, though they are not limited thereto.

The transfer belt 105 carries a toner image (full-color toner image) transferred by the photosensitive drums 103Y, 103M, 103C, and 103K in a superimposed manner to a secondary transfer position of the secondary transfer roller 107. In this embodiment, the yellow toner image is first transferred to the transfer belt 105, and the magenta toner image, the cyan toner image, and the black toner image are sequentially transferred in a superimposed manner, but are not limited thereto.

The paper feeder 109 contains a plurality of sheets of paper in a stacked manner, and feeds the paper.

The pair of feed rollers 111 carries the paper fed by the paper feeder 109 in a direction of an arrow s on a conveyance path a.

The secondary transfer roller 107 batch transfers the full-color toner image carried by the transfer belt 105 to the paper carried by the pair of feed rollers 111 at the second transfer position.

The fixing roller 113 fixes the full-color toner image on the paper by heating and pressing the paper on which the full-color toner image is transferred.

In the case of one-side printing, the printer 100 feeds a printed matter, that is, the paper on which the full-color toner image is fixed, to the printed matter examination device 200.

In the case of double-side printing, on the other hand, the printer 100 feeds the paper on which the full-color toner image is fixed, to the inversion path 115.

The inversion path 115 switches back the fed paper to turn the paper upside down and carry the paper in a direction of an arrow t. The paper carried by the inversion path 115 is carried again by the pair of feed rollers 111. The secondary transfer roller 107 transfers a full-color toner image on the opposite side of the paper, and the fixing roller 113 fixes the full-color toner image thereon. The paper is fed to the printed matter examination device 200 as a printed matter.

The printed matter examination device 200 includes reading units 201A and 201B and an operation panel 240.

The operation panel 240 is an operation display unit through which various input operations are performed to the printed matter examination device 200 and on which various screens are displayed. It is noted that the operation panel 240 may be omitted. In this case, the operation panel 101 may also serve as the operation panel 240, or an externally connected PC (personal computer) may also serve as the operation panel 240.

The reading unit 201A electrically reads one side of the printed matter fed from the printer 100, while the reading unit 201B electrically reads the other side of the printed matter. The reading units 201A and 201B may be, for example, line scanners or the like. The printed matter examination device 200 ejects the printed matter after the completion of reading to the stacker 300.

The stacker 300 includes a tray 301. The stacker 300 stacks the printed matters ejected from the printed matter examination device 200 on the tray 301.

Figure 2:
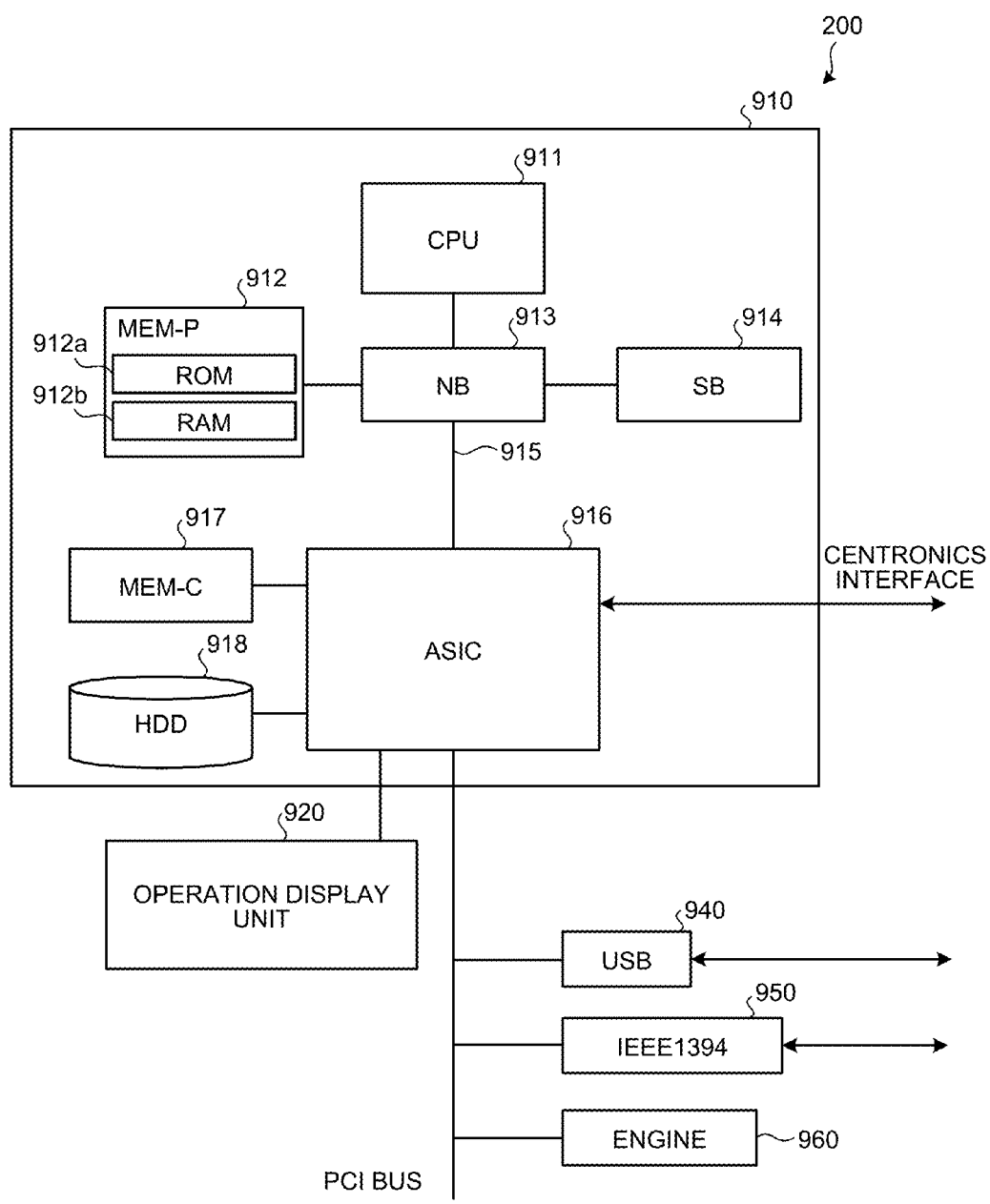
FIG. 2 is a block diagram showing an example of a hardware configuration of a printed matter examination device according to the embodiment.

FIG. 2 is a block diagram showing an example of a hardware configuration of the printed matter examination device 200 according to this embodiment. As shown in FIG. 2, the printed matter examination device 200 includes a controller 910 and an engine 960 connected through a PCI bus. The controller 910 controls the entire printed matter examination device 200, the drawing and communication of the printed matter examination device 200, and input from an operation display unit 920. The engine 960 is an engine connectable to the PCI bus, and is, for example, a scanner engine such as a scanner. The engine 960 includes an image processor for error diffusion, gamma conversion, or the like, as well as the engine itself.

The controller 910 includes a central processing unit (CPU) 911, a north bridge (NB) 913, a system memory (MEM-P) 912, a south bridge (SB) 914, a local memory (MEM-C) 917, an application specific integrated circuit (ASIC) 916, and a hard disk drive (HDD) 918. The north bridge (NB) 913 and the ASIC 916 are connected through an accelerated graphics port (AGP) bus 915. Furthermore, the MEM-P 912 includes a ROM 912*a* and a RAM 912*b*.

The CPU 911 controls the entire printed matter examination device 200. The CPU 911 has a chip set constituted of the NB 913, the MEM-P 912, and the SB 914. The CPU 911 is connected to other devices through the chip set.

The NB 913 is a bridge for connecting the CPU 911 to the MEM-P 912, the SB 914, and the AGP bus 915. The NB 913 has a memory controller that controls reading from and writing to the MEM-P 912, a PCI master, and an AGP target.

The MEM-P 912 is a system memory used as a program and data storage memory, a program and data expansion memory, a printer drawing memory, or the like. The MEM-P 912 is constituted of the ROM 912*a* and the RAM 912*b*. The ROM 912*a* is a read-only memory used as a program and data storage memory. The RAM 912*b* is a writable and readable memory used as a program and data expansion memory, a printer drawing memory, or the like.

The SB 914 is a bridge for connecting the NB 913 to the PCI device and peripheral devices. The SB 914 is connected to the NB 913 through the PCI bus. To the PCI bus, a network interface (I/F) and the like are connected too.

The ASIC 916 is an IC (Integrated Circuit) specific to an image processing application having elements of image processing hardware. The ASIC 916 acts as a bridge for connecting each of the AGP bus 915, the PCI bus, the HDD 918, and the MEM-C 917. The ASIC 916 is constituted of a PCI target, an AGP master, an arbiter (ARB) that forms the heart of the ASIC 916, a memory controller for controlling the MEM-C 917, a plurality of direct memory access controllers (DMAC) for performing the rotation and the like of image data by hardware logics and the like, and a PCI unit for performing data transfer to and from the engine 960 through the PCI bus. To the ASIC 916, a USB 940 and an IEEE1394 (the Institute of Electrical and Electronics Engineers 1394) interface (I/F) 950 are connected through the PCI bus. The operation display unit 920 is directly connected to the ASIC 916.

The MEM-C 917 is a local memory used as a copy image buffer and a code buffer. The HDD 918 is storage for storing image data, programs, font data, and forms.

The AGP bus 915 is a bus interface for a graphics accelerator card, which is proposed to accelerate graphics processing. The AGP bus 915 accelerates the graphics accelerator card by direct access to the MEM-P 912 with high throughput.

Figure 3:
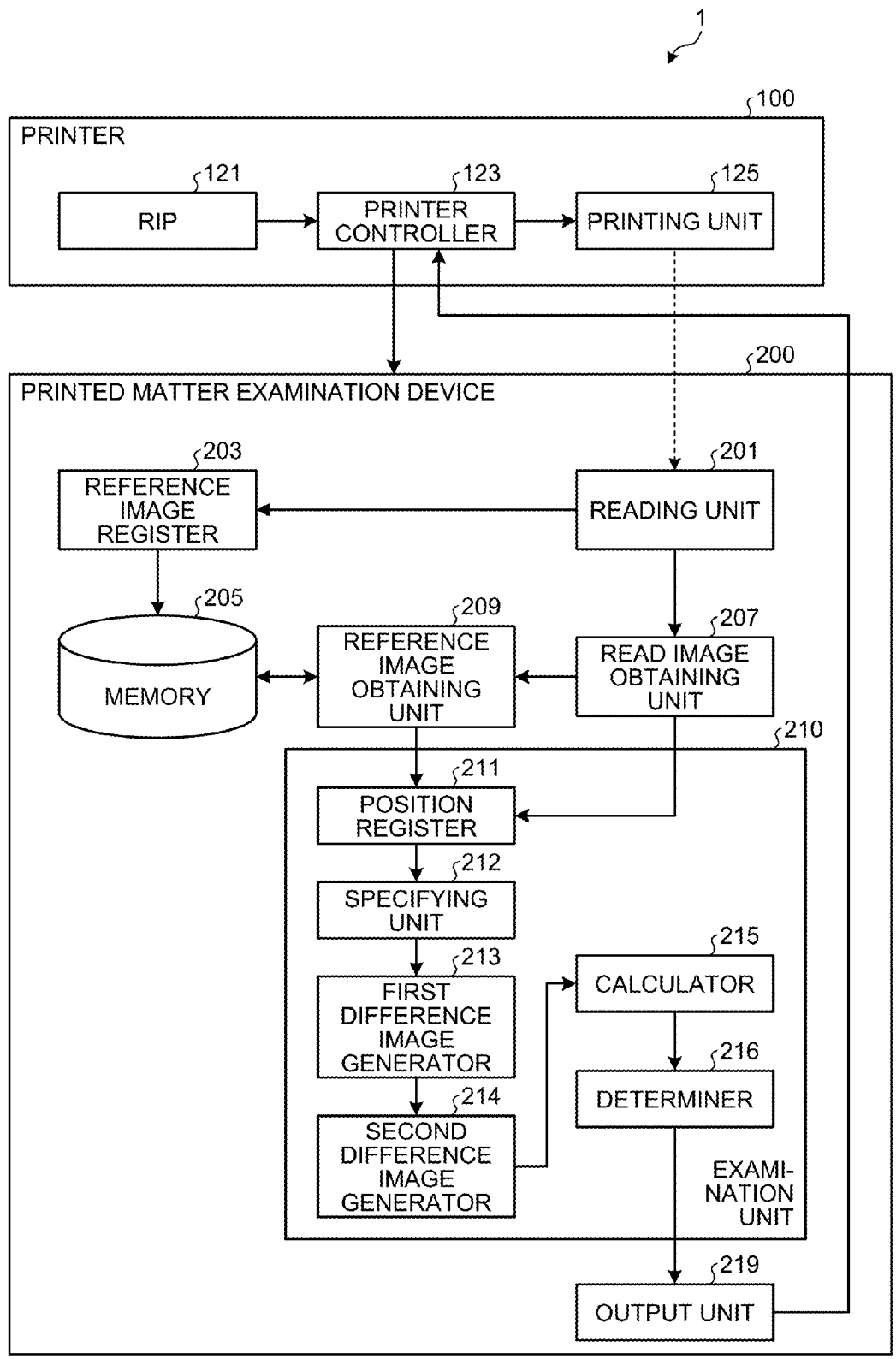
FIG. 3 is a block diagram showing an example of a configuration of a printer and the printed matter examination device according to the embodiment.

FIG. 3 is a block diagram showing an example of the configuration of the printer 100 and the printed matter examination device 200 according to this embodiment. As shown in FIG. 3, the printer 100 includes a raster image processor (RIP) 121, a printer controller 123, and a printing unit 125. The printed matter examination device 200 includes a reading unit 201, a reference image register 203, a memory 205, a read image obtaining unit 207, a reference image obtaining unit 209, an examination unit 210, and an output unit 219. The examination unit 210 includes a position register 211, a specifying unit 212, a first difference image generator 213, a second difference image generator 214, a calculator 215, and a determiner 216.

This embodiment takes a case in which the printer 100 is provided with the RIP 121 as an example, but not limited thereto, and a device such as a DFE (Digital Front End) other than the printer 100 may be provided with the RIP 121.

This embodiment assumes that the printer 100 and the printed matter examination device 200 are connected through a local interface such as USB (Universal Serial Bus) or PCIe (Peripheral Component Interconnect Express), but the connection scheme between the printer 100 and the printed matter examination device 200 is not limited thereto.

The RIP 121 and the printer controller 123 may be realized by software, that is, by executing a program by a processor, e.g., a CPU (Central Processing Unit), by hardware such as an IC or an ASIC, or by concurrent use of the software and the hardware. The printing unit 125 is realized from, for example, the photosensitive drums 103Y, 103M, 103C, and 103K, the transfer belt 105, the secondary transfer roller 107, the fixing roller 113, and the like, but is not limited thereto. Images are printed by electrophotography in this embodiment, but not limited thereto, and may be printed by ink-jet printing.

The reading unit 201 is constituted of the reading units 201A and 201B, and can be realized by, for example, the engine 960 and the like. The reference image register 203, the read image obtaining unit 207, the reference image obtaining unit 209, the examination unit 210 (the position register 211, the specifying unit 212, the first difference image generator 213, the second difference image generator 214, the calculator 215, and the determiner 216), and the output unit 219 can be realized by, for example, the CPU 911, the system memory 912, the ASIC 916, the operation display unit 920, the engine 960, and the like. The memory 205 can be realized by, for example, the system memory 912 and the like.

The operation of the printer 100 and the printed matter examination device 200 will be described below. The operation of generating a reference image (master image), which is a reference of an examination of a printed matter, will be first described, and the operation of examination of the quality of a printed image using the generated reference image will be described thereafter.

First, the reference image generation operation will be described.

The RIP 121 receives print data from an external device such as a host device, and applies RIP processing to the received print data to generate an RIP image. In this embodiment, the print data includes job information described in a page description language (PDL) such as PostScript (registered trademark), TIFF (Tagged Image File Format) format image data, and the like, but is not limited thereto. Also, the RIP image is CMYK RIP image data in this embodiment, but is not limited thereto.

The printer controller 123 transmits the RIP image generated by the RIP 121 to the printing unit 125.

The printing unit 125 prints, on paper, a printing image based on the RIP image by performing a printing process such as an image formation process, to generate a printed matter.

The reading unit 201 generates a read image by reading the printed matter generated by the printing unit 125. To be more specific, the reading unit 201 generates a read image by reading the printed matter on which the printing image based on the RIP image is printed. In this embodiment, the read image is RGB image data, but is not limited thereto.

The reference image register 203 obtains the read image from the reading unit 201, and registers the obtained read image on the memory 205 as a reference image. To be more specific, the reference image register 203 registers one or more read images that are commanded to be registered on the memory 205, as one or more reference images.

For example, the reference image register 203 displays information about the obtained read image on the operation panel 240. The information about the obtained read image may be any of an image, ID information for identifying an image, and the like, as long as the information can identify the read image. An examiner visually checks a printed surface of the printed matter used for generating the read image, and inputs an operation from the operation panel 240 to command the registration of the read image that is determined to be good, as a reference image. Thus, the reference image register 203 registers the commanded read image on the memory 205 as a reference image.

As described above, this embodiment describes an example in which the good read image is made into the reference image. However, a method for generating the reference image is not limited to this, but, for example, the reference image may be made from the RIP image.

Note that, in this embodiment, when the printed matter examination device 200 is put in a reference image registration mode, the read image is outputted from the reading unit 201 to the reference image register 203, and the reference image register 203 performs the above operation. For example, the examiner changes the mode of the printed matter examination device 200 on the operation panel 240, and mode information representing a set mode is stored in, for example, the system memory 912.

Next, the examination operation will be described.

The operation of the RIP 121 is the same as that during the reference image generation operation. However, since a RIP image generated by the RIP 121 is the same as the RIP image generated during the reference image generation operation, the RIP image generated during the reference image generation operation may be used, instead of generating a new RIP image.

The printer controller 123 transmits the RIP image generated by the RIP 121 to the printing unit 125, and transmits the job information contained in the print data received by the RIP 121 to the printed matter examination device 200.

Using an examination result transmitted (fed back) from the printed matter examination device 200, the printer controller 123 specifies where to eject a printed matter that has failed a quality examination to, e.g., the stacker 300, marks the printed matter that has failed the quality examination, and commands the printing unit 125 to print for replacement.

The operation of the printing unit 125 is the same as that during the reference image generation operation, and the operation of the reading unit 201 is the same as that during the reference image generation operation.

The read image obtaining unit 207 obtains a read image from the reading unit 201, and outputs the obtained read image to the examination unit 210. Note that, in this embodiment, when the printed matter examination device 200 is put in an examination mode, the read image is outputted from the reading unit 201 to the read image obtaining unit 207, and the read image obtaining unit 207 performs the above operation.

The reference image obtaining unit 209 obtains a reference image, which is a reference of an examination of a printed matter. To be more specific, when the read image obtaining unit 207 obtains the read image, the reference image obtaining unit 209 obtains the reference image from the memory 205 and outputs the obtained reference image to the examination unit 210.

The examination unit 210 performs a comparison between the read image outputted from the read image obtaining unit 207 and the reference image outputted from the reference image obtaining unit 209, to examine the quality of a printed matter generated by the printer 100.

The position register 211 performs positioning between the read image outputted from the read image obtaining unit 207 and the reference image outputted from the reference image obtaining unit 209.

The specifying unit 212 specifies the type of each area constituting the reference image, from the reference image after the positioning by the position register 211.

In this embodiment, the specifying unit 212 specifies whether the type of each pixel constituting the reference image is a pixel constituting an edge area, a pixel constituting a flat area, or a pixel constituting a picture area by calculating a standard deviation and the like on the reference image, to thereby specify whether the type of each area constituting the reference image is the edge area, the flat area, or the picture area. The specifying unit 212 generates an area type image by which the type of each area constituting the reference image can be specified. Note that, the flat area is an area in which the density variations of pixels are within a predetermine range (the density is uniform). The picture area is an area in which an edge is present and the density variations of pixels are within a predetermined range.

It is noted that, for example, equations (1) and (2) are used for calculating the standard deviation of each pixel constituting the reference image.

$$X_{ave} = \frac{1}{N}\sum_{i=1}^{N} x_i \quad (1)$$

$$\sigma = \sqrt{\frac{1}{N}\sum_{i=1}^{N}(x_i - X_{ave})^2} \quad (2)$$

where, N represents an area type determination window (n×n) that is constituted of n×n pixels.

More specifically, the specifying unit 212 sets the area type determination window (n×n) that centers on each pixel constituting the reference image, and calculates the standard deviation σ of an area designated by the set area type determination window (n×n) using the equations (1) and (2).

The specifying unit 212 determines a maximum value of a plurality of calculated standard deviations σ of each pixel constituting the reference image as the standard deviation of the pixel, and specifies the type of each area constituting the reference image by a comparison between the standard deviation of each pixel constituting the reference image and a threshold value.

For example, the specifying unit 212 makes the comparison using two types of threshold values, that is, an edge determination threshold value SE and a picture determination threshold value SI (SE>SI). When the standard deviation of a pixel to be determined is more than the edge determination threshold value SE, the pixel is determined to be a pixel constituting the edge area. When the standard deviation of a pixel to be determined is equal to or less than the edge determination threshold value SE and more than the picture determination threshold value SI, the pixel is determined to be a pixel constituting the picture area. When the standard deviation of a pixel to be determined is equal to or less than the picture determination threshold value SI, the pixel is determined to be a pixel constituting the flat area.

The specifying unit 212 prepares a corresponding image that corresponds to the reference image. The specifying unit 212 places a pixel value indicating a component of the edge area in a pixel of the corresponding image that corresponds to a pixel of the reference image constituting the edge area, places a pixel value indicating a component of the picture area in a pixel of the corresponding image that corresponds to a pixel of the reference image constituting the picture area, and places a pixel value indicating a component of the flat area in a pixel of the corresponding image that corresponds to a pixel of the reference image constituting the flat area, to generate the area type image.

The first difference image generator 213 compares the reference image and the read image after the positioning by the position register 211 on a pixel-by-pixel basis, and generates a first difference image, which is constituted of difference values of pixel values.

The examination unit 210 performs various defect determinations based on the first difference image, and generates defect determination information of each defect determination. As the defect determination information, there are, for example, a defect determination image that is generated by coloring a defect portion of the reference image, the position of a defect, and the like. The examination unit 210 integrates the various types of defect determination information generated by various defect determinations by, for example, logical sum, and performs a final defect determination using the integrated defect determination information. For example, a portion (pixel group) having a large difference and a portion (pixel group) of large size having differences become final defects.

The various defect determinations include a line defect determination for determining whether there is a line defect, a dot defect determination for determining whether there is a dot defect, an unevenness defect determination for determining whether there is an unevenness defect, and the like. However, this embodiment specifically describes the line defect determination because this embodiment aims at the line defect determination, and omits description of the other defect determinations including the dot defect determination, the unevenness defect determination, and the like.

In the line defect determination, in general, a moving average is calculated using a filter extending in the direction of occurrence of a line. In this method, however, when strong noise occurs in the direction of occurrence of a line, the noise may be mistakenly detected as a line.

People tend to recognize a continuation of the density relation of adjoining pixels in a certain length in the same condition as a line defect. For example, in both images shown in FIGS. 4 and 5, middle three columns have the same average of pixel values. However, in the image shown in FIG. 5, the layout of pixels is changed in the middle three columns so as to continue a condition in which a pixel value (density) is darker in a central one column than in adjoining pixel columns.

Figure 4:
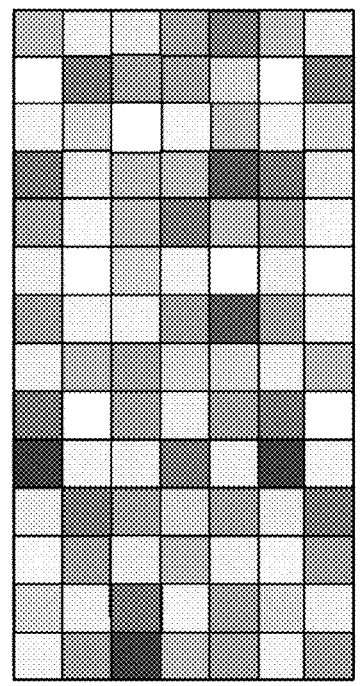
FIG. 4 is an explanatory view showing an example of noise in the embodiment.
Figure 5:
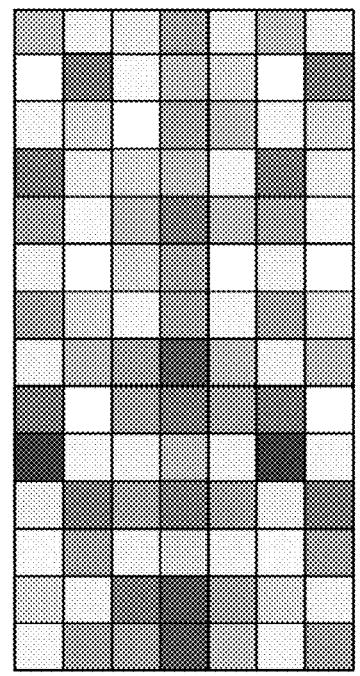
FIG. 5 is an explanatory view showing an example of a line defect in the embodiment.

Therefore, in the case of the example shown in FIGS. 4 and 5, it is preferably determined that no line defect occurs (noise occurs) in the image of FIG. 4, while a line defect occurs in the image of FIG. 5. However, in the method using the filter as described above, it is determined that a line defect occurs in both of the images or in neither of the images.

Accordingly, this embodiment describes a line defect determination that can prevent a wrong detection of strong noise occurring in the direction of occurrence of a line as a line defect.

The second difference image generator 214 calculates a difference value in pixel values between each pixel and a pixel located at a position away from the each pixel by the predetermined number of pixels in a first direction in a detection target image from which a line defect is to be detected and which is at least one of the reference image and the read image after the positioning by the position register 211 and the first difference image generated by the first difference image generator 213, and then generates a second difference image, which is constituted of the calculated difference values as pixel values.

This embodiment takes a case where the detection target image is the first difference image as an example, but is not limited thereto. This embodiment takes a case where the first direction is a horizontal direction as an example, but is not limited thereto. This embodiment takes a case where the predetermined number of pixels is 1 and the pixel located at the predetermined number of pixels away is an adjoining pixel, as an example, but is not limited thereto. This embodiment takes a case where the difference value is a difference value with a sign that is approximately centered on 0, but is not limited thereto.

Figure 7:
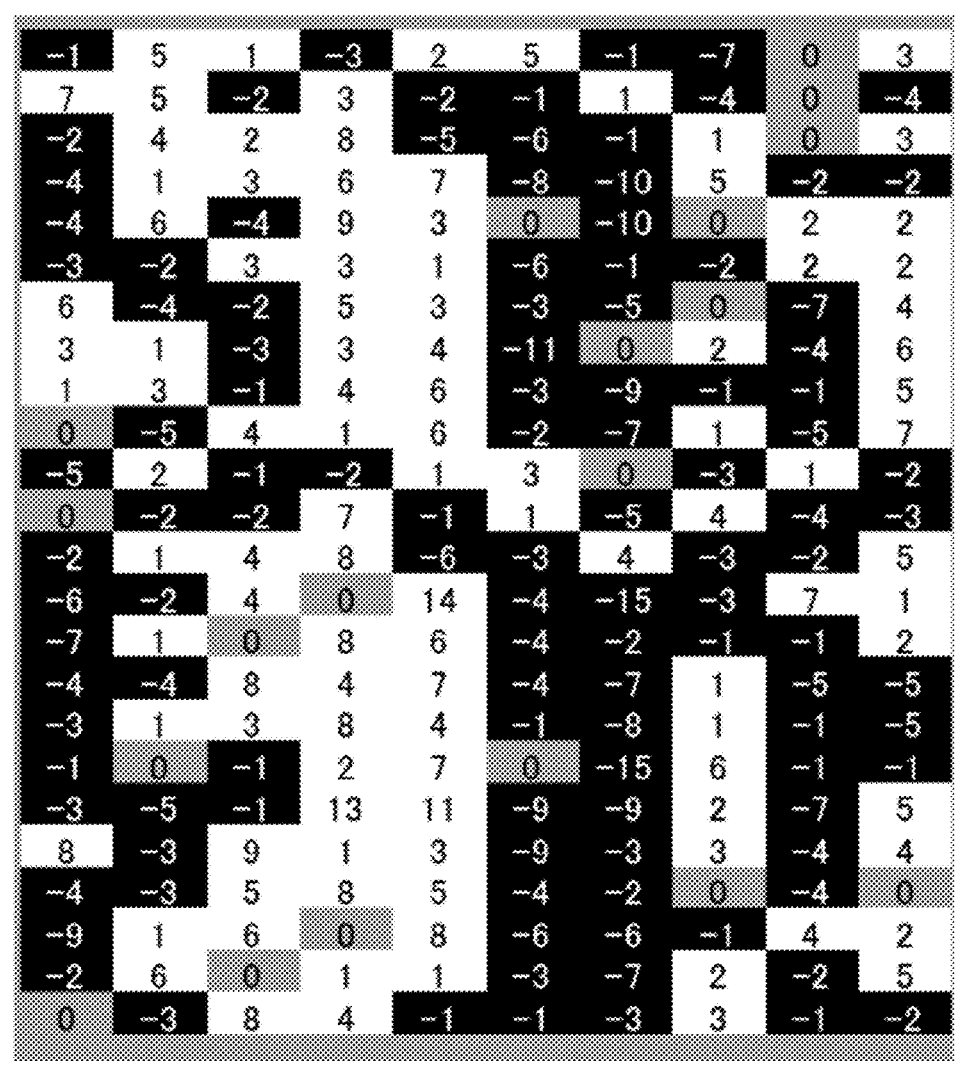

For example, when a first difference image shown in FIG. 6 is a detection target image, the second difference image generator 214 calculates a difference value between each pixel constituting the detection target image and a pixel adjoining in the horizontal direction (right direction), and generates a second difference image as shown in FIG. 7.

Note that, in the first difference image shown in FIG. 6, numerical values represent pixel values. In the first difference image shown in FIG. 6, a light white line (line defect) occurs in a vertical direction in a frame 401. In the second difference image shown in FIG. 7, numerical values represent pixel values that are calculated difference values. Pixels having positive pixel values are shaded white, pixels having negative pixel values are shaded black, and pixels having a pixel value of 0 are shaded gray.

In each of a plurality of pixel columns extending in a second direction orthogonal to the first direction in a detection target area in the second difference image generated by the second difference image generator 214, the calculator 215 calculates a first pixel number that is the number of pixels the pixel values of which are more than a first threshold value and a second pixel number that is the number of pixels the pixel values of which are less than the first threshold value, out of a plurality of pixels constituting the pixel columns.

This embodiment takes a case where the entire second difference image is a detection target area from which a line defect is to be detected as an example, but is not limited thereto. For example, a predetermined-size area centered on each pixel constituting the second difference image may be a detection target area. This embodiment takes a case where the second direction is the vertical direction as an example, because the first direction is the horizontal direction as described above, but is not limited thereto. This embodiment takes a case where each pixel column constituting the detection target area is a pixel column having a width of one pixel and a length of twenty-four pixels, as an example, but is not limited thereto. Especially, the length (the length of the detection target area in the vertical direction) may be at least ten pixels or more, although it depends on the resolution of the second difference image. This embodiment takes a case where the first threshold value is 0 as an example, but is not limited thereto.

Figures 8, 9:
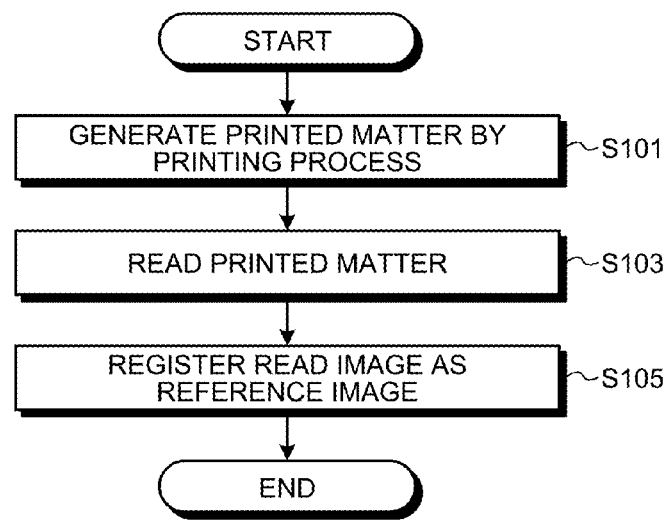
FIG. 8 is a table showing calculation results of a first pixel number and a second pixel number of each pixel column in the second difference image shown in FIG. 7.
FIG. 9 is a flowchart showing an example of the procedure of a reference image generation process performed by the printed matter examination system according to the embodiment.

FIG. 8 is a table showing the calculation results of a first pixel number and a second pixel number of each pixel column in the second difference image (detection target area) shown in FIG. 7. In the example of FIG. 8, the first pixel number is represented as a positive number (positive pixel number) and the second pixel number is represented as a negative number (negative pixel number).

The determiner 216 determines whether there is a line defect constituted of one or more pixel columns in the detection target area based on the ratio between the first pixel number and the second pixel number of each pixel column calculated by the calculator 215.

To be more specific, when the ratio of the second pixel number relative to the first pixel number in the pixel column is equal to or more than a first value, or when the ratio of the first pixel number relative to the second pixel number in the pixel column is equal to or more than a first value, the determiner 216 determines that there is a line defect constituted of one or more pixel columns. Note that, the first value is represented by X below.

In this embodiment, the determiner 216 first determines which of the first pixel number and the second pixel number is larger in the pixel column. When the second pixel number is larger, the determiner 216 determines whether the second pixel number is X times or more of the first pixel number.

When the first pixel number is larger, the determiner 216 determines whether the first pixel number is X times or more of the second pixel number.

That is to say, when the second pixel number is larger, the determiner 216 determines whether the second pixel number is X times or more of the first pixel number to determine whether the ratio of the second pixel number relative to the first pixel number is X or more. When the first pixel number is larger, the determiner 216 determines whether the first pixel number is X times or more of the second pixel number to determine whether the ratio of the first pixel number relative to the second pixel number is X or more.

When the second pixel number is X times or more of the first pixel number or the first pixel number is X times or more of the second pixel number in the pixel column, the density relation between adjoining pixels is determined to be almost uniform in this pixel column (see FIG. 5), so the determiner 216 determines that this pixel column is a line defect.

For example, in the calculation results shown in FIG. 8, when X=3.5, as shown in FIG. 8, pixel columns within a frame 402, that is, middle four pixel columns in the second difference image (detection target area) shown in FIG. 7 are determined to be a line defect, and thus the vertical light white line occurring in the frame 401 of the first difference image shown in FIG. 6 is correctly determined to be a line defect.

As described above, the examination unit 210 integrates such a line defect determination result with other defect determination results, and makes a final defect determination. A final defect determination result is outputted from the output unit 219 to the printer 100, and stored in the system memory 912.

FIG. 9 is a flowchart showing an example of the procedure of a reference image generation process performed by the printed matter examination system 1 according to this embodiment.

First, the printer 100 performs a printing process to generate a printed matter (step S101).

Subsequently, the reading unit 201 of the printed matter examination device 200 generates a read image of the printed matter generated by the printer 100 (step S103).

Subsequently, the reference image register 203 obtains the read image from the reading unit 201, and registers the obtained read image with the memory 205 as a reference image based on a registration command by an examiner from the operation panel 240 (step S105).

Figure 10:
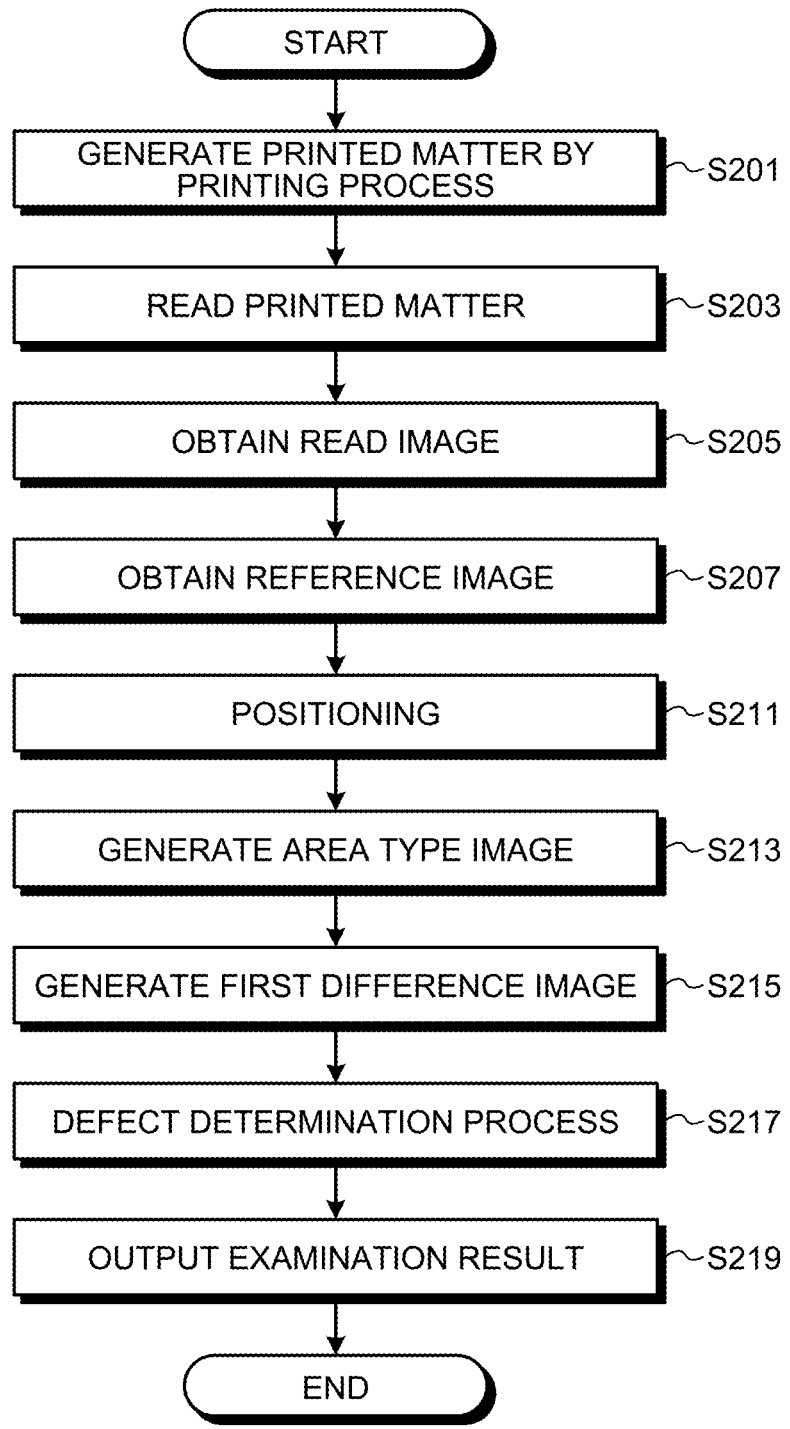
FIG. 10 is a flowchart showing an example of the procedure of an examination process performed by the printed matter examination system according to the embodiment.

FIG. 10 is a flowchart showing an example of the procedure of an examination process performed by the printed matter examination system 1 according to this embodiment.

First, process in steps S201 and S203 is the same as that in steps S101 and S103 of the flowchart shown in FIG. 9.

Subsequently, the read image obtaining unit 207 obtains the read image from the reading unit 201, and outputs the obtained read image to the examination unit 210 (step S205).

Subsequently, when the read image obtaining unit 207 obtains the read image, the reference image obtaining unit 209 obtains the reference image from the memory 205, and outputs the obtained reference image to the examination unit 210 (step S207).

Subsequently, the position register 211 performs positioning between the read image outputted from the read image obtaining unit 207 and the reference image outputted from the reference image obtaining unit 209 (step S211).

Subsequently, the specifying unit 212 generates an area type image by which the type of each area constituting the reference image can be specified, based on the reference image after the positioning by the position register 211 (step S213).

Subsequently, the first difference image generator 213 generates a first difference image, which is constituted of differences in pixel values by making comparisons between the reference image and the read image after the positioning by the position register 211 on a pixel-by-pixel basis (step S215).

Subsequently, the examination unit 210 performs a defect determination process based on the first difference image generated by the first difference image generator 213 (step S217).

Subsequently, the output unit 219 outputs a final defect determination result based on defect determination results to the printer 100 (step S219).

Figure 11:
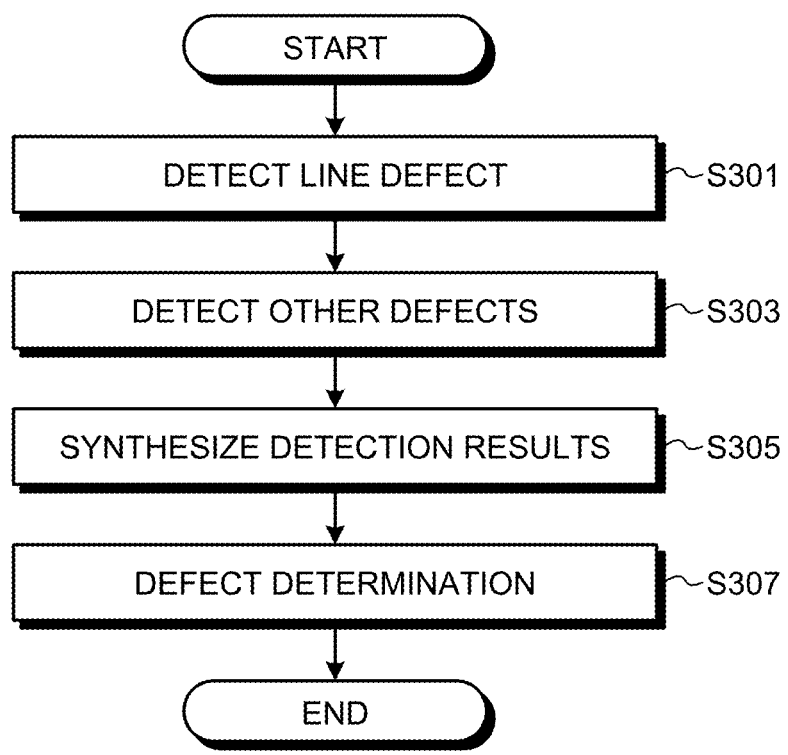
FIG. 11 is a flowchart showing an example of the procedure of a defect determination process performed in step S217 of the flowchart shown in FIG. 10.

FIG. 11 is a flowchart showing an example of the procedure of the defect determination process performed in step S217 of the flowchart shown in FIG. 10.

First, the examination unit 210 performs a line defect determination (detection) based on the first difference image generated by the first difference image generator 213 (step S301).

Subsequently, the examination unit 210 performs other defect determinations (detections) based on the first difference image generated by the first difference image generator 213 (step S303). The other defect determinations include a dot defect determination, an unevenness defect determination, and the like. The examination unit 210 performs the dot defect determination and the unevenness defect determination collectively by, for example, threshold processing or the like. Note that, the examination unit 210 may perform the dot defect determination and the unevenness defect determination separately. The order of processing steps S301 and S303 is not limited to this, and, for example, the processing order may be reversed or steps S301 and S303 may be performed in parallel.

Subsequently, the examination unit 210 integrates (synthesizes) the result of the line defect determination and the results of the other defect determinations (step S305), and performs a final defect determination using the integrated defect determination result (step S307).

Figure 12:
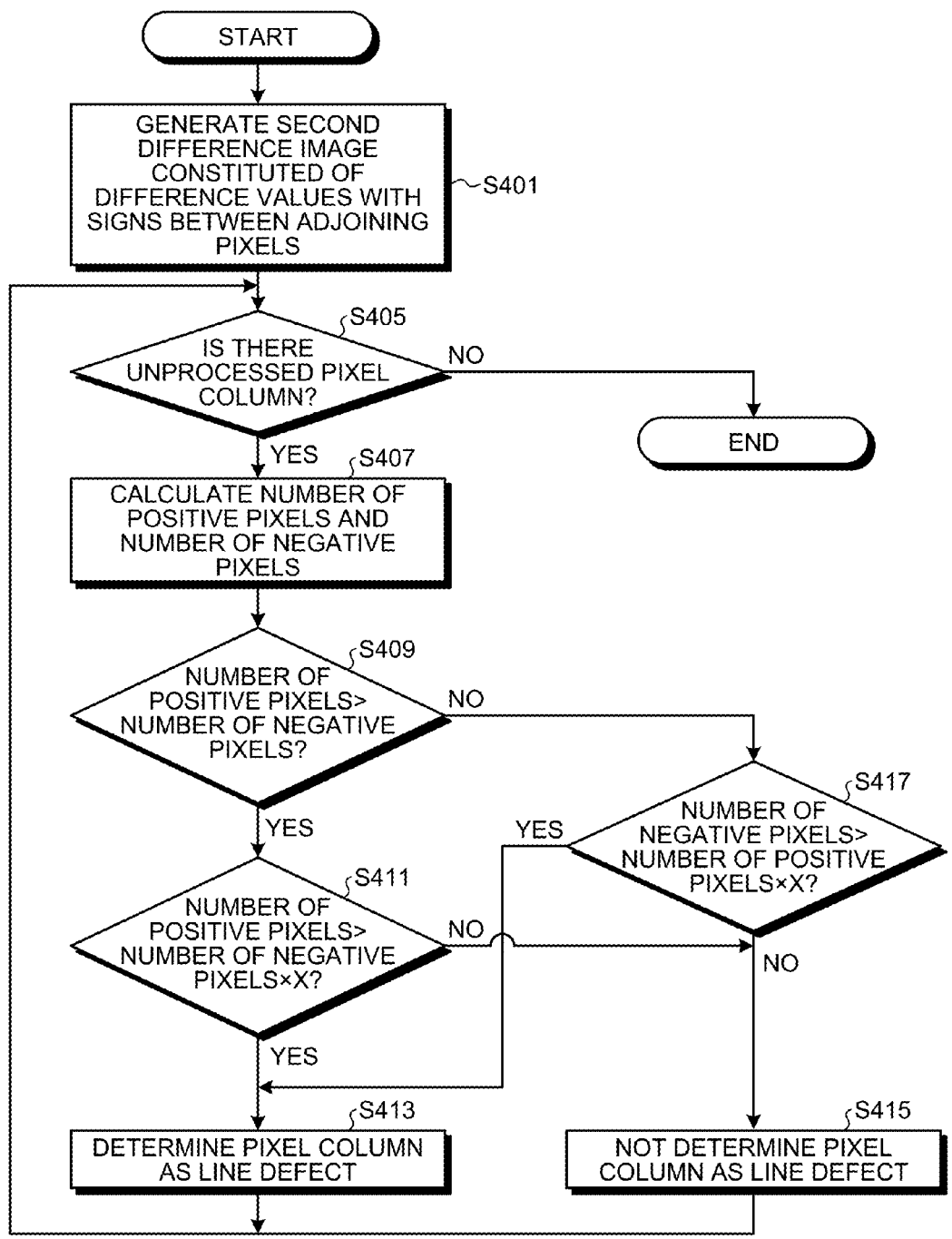
FIG. 12 is a flowchart showing an example of the procedure of a line defect determination performed in step S301 of the flowchart shown in FIG. 11.

FIG. 12 is a flowchart showing an example of the procedure of a line defect determination performed in step S301 of the flowchart shown in FIG. 11.

First, the second difference image generator 214 calculates a difference with a sign in pixel values between each pixel constituting a detection target image that is the first difference image generated by the first difference image generator 213 and its adjoining pixel in the horizontal direction, and generates a second difference image, which is constituted of the calculated difference values with the signs as pixel values (step S401).

Subsequently, when there is an unprocessed pixel column of a plurality of pixel columns in the vertical direction that constitute a detection target area in the second difference image generated by the second difference image generator 214 (Yes in step S405), the calculator 215 calculates a first pixel number (the number of positive pixels) that is the number of pixels having a pixel value of more than 0 and a second pixel number (the number of negative pixels) that is the number of pixels having a pixel value of less than 0, out of a plurality of pixels constituting the pixel column (step S407).

Subsequently, in a case where the first pixel number (the number of positive pixels)>the second pixel number (the number of negative pixels) (Yes in step S409), if the first pixel number (the number of positive pixels)>the second pixel number (the number of negative pixels)×X (Yes in step S411), the determiner 216 determines that the corresponding pixel column is a line defect (step S413). If the first pixel number (the number of positive pixels)>the second pixel number (the number of negative pixels)×X does not hold true (No in step S411), the determiner 216 determines that the corresponding pixel column is not a line defect (step S415).

Likewise, in a case where the first pixel number (the number of positive pixels)>the second pixel number (the number of negative pixels) does not hold true (No in step S409), if the second pixel number (the number of negative pixels)>the first pixel number (the number of positive pixels)×X (Yes in step S417), the determiner 216 determines that the corresponding pixel column is a line defect (step S413). If the second pixel number (the number of negative pixels)>the first pixel number (the number of positive pixels)×X does not hold true (No in step S417), the determiner 216 determines that the corresponding pixel column is not a line defect (step S415).

The process of steps S405 to S417 is repeated until running out of unprocessed pixel columns. When running out of the unprocessed pixel columns (No in step S405), the process is ended.

It is noted that, when there are a plurality of detection target areas, the process of steps S405 to S417 is performed for each detection target area.

According to this embodiment, as described above, it is possible to prevent a wrong detection of strong noise occurring during a printing or reading process as a line defect, thus improving line defect detection accuracy.

Modification Example 1

The above-described embodiment does not consider the type of each area constituting the reference image in the detection target area, but the type of each area may be considered.

For example, a pixel of a detection target image (second difference image) corresponding to a pixel constituting an edge area of a reference image may be excluded from a detection target area. This is because the pixel of the detection target image (second difference image) corresponding to the pixel constituting the edge area of the reference image may have an unintended difference value due to the effects of a minute deviation of 1 pixel or less between the reference image and a read image when generating the second difference image, and the like.

In this case, when any pixel used for calculating a difference value corresponds to a pixel constituting an edge area of a reference image, the second difference image generator 214 may set a difference value at a first threshold value (0). It is noted that whether any pixel used for calculating a difference value corresponds to a pixel constituting an edge area of a reference image can be determined with reference to an area type image generated by the specifying unit 212.

For example, the pixel value of a pixel of a first difference image corresponding to a pixel constituting a picture area of a reference image may be modified. In this case, the first difference image generator 213 may modify the pixel value of the pixel corresponding to the pixel constituting the picture area of the reference image using a modification value. The modification value may be a predetermined constant, or may be calculated from a standard deviation calculated by the specifying unit 212 when generating an area type image. It is noted that whether a pixel corresponds to a pixel constituting a picture area of a reference image can be determined with reference to an area type image generated by the specifying unit 212.

Figure 13:
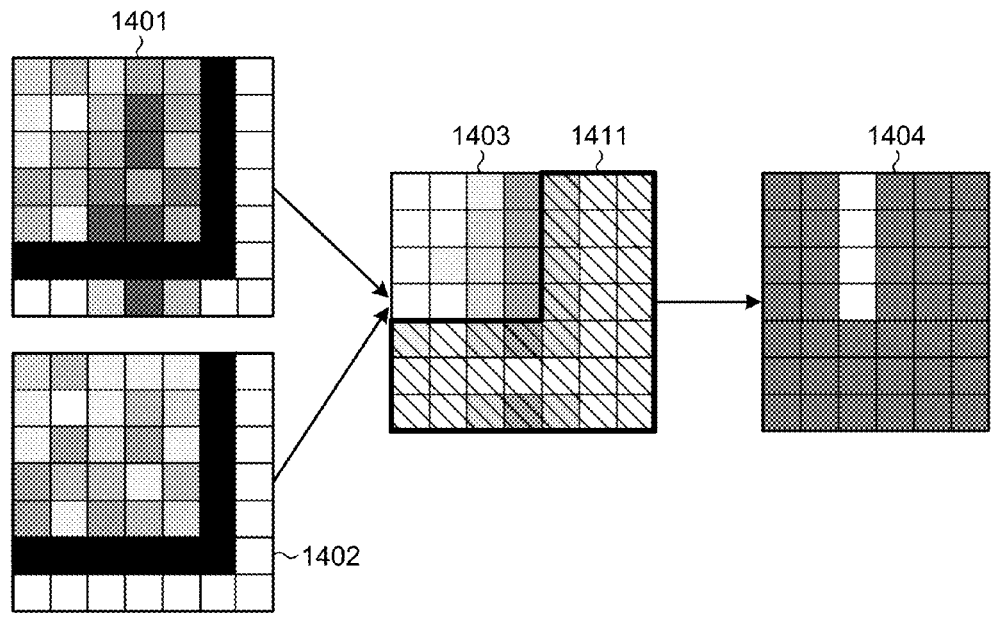
FIG. 13 is an explanatory view of a modification example 1.

For example, as shown in FIG. 13, a first difference image 1403 may be generated from a read image 1401 and a reference image 1402. In the first difference image 1403, a diagonally shaded area 1411 corresponds to an edge area of the reference image 1402, and the other areas correspond to a picture area of the reference image 1402.

In this case, when a second difference image 1404 is generated from the first difference image 1403, the second difference image generator 214 corrects difference values calculated using pixels constituting the area 1411 corresponding to the edge area of the reference image 1402 to the first threshold value (0). The first difference image generator 213 modifies the pixel values of pixels constituting the areas corresponding to the picture area of the reference image 1402, and the second difference image generator 214 calculates difference values representing the differences of pixel values after the modification. In the example of FIG. 13, pixel values are modified in the second and third pixel columns of the first difference image 1403 from the left, and thus difference values representing the differences between pixel values of the two columns become zero.

Modification Example 2

Flare and the like are detected as a line defect in a color border in the above-described embodiment, but the flare may be made undetected as a line defect. Although flare is a kind of defect, the flare is not required to be detected with high accuracy, unlike a line defect, and therefore the detection of the flare as a line defect brings about excessive detection.

Figure 14:
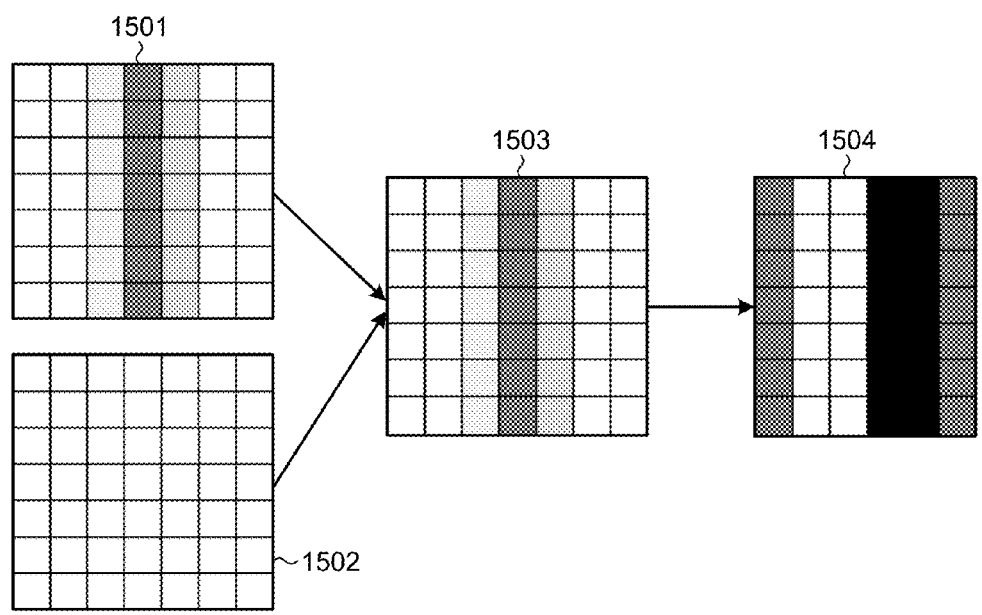
FIG. 14 is an explanatory view of a modification example 2.

For example, as shown in FIG. 14, a first difference image 1503 is generated from a read image 1501 and a reference image 1502, and a second difference image 1504 is generated from the first difference image 1503. Note that, a line defect occurs in the read image 1501, and the entire reference image 1502 is a flat area. In the example of FIG. 14, since the line defect occurs in a middle column of the read image 1501, a right side of the second difference image 1504 relative to its center is negative (black), while a left side thereof is positive (white). In the case of the line defect, as described above, the positive continuous line defect and the negative continuous line defect adjoin.

Figure 15:
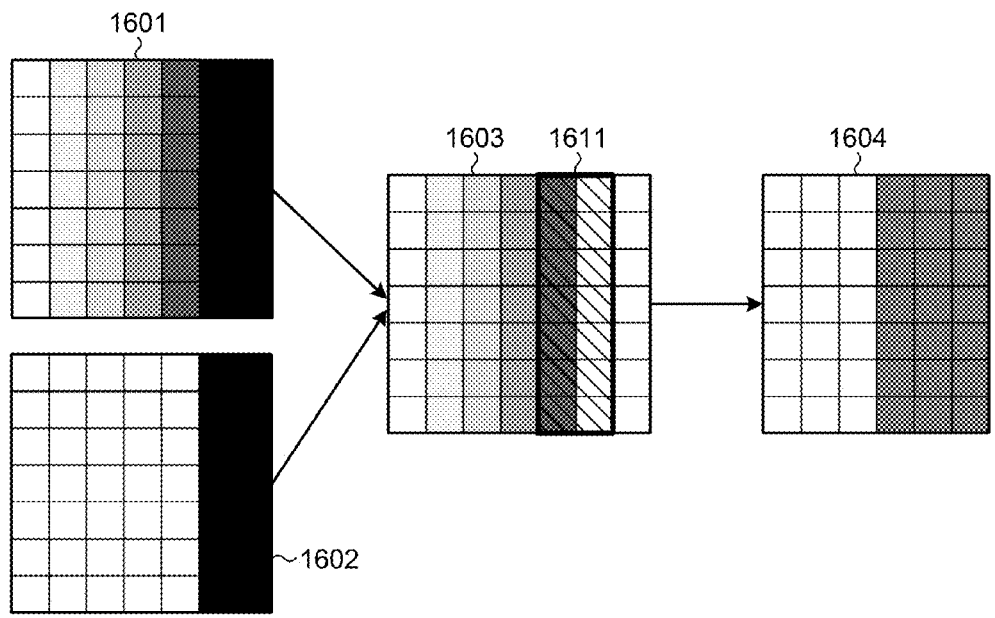
FIG. 15 is an explanatory view of the modification example 2.

On the other hand, as shown in FIG. 15, a first difference image 1603 is generated from a read image 1601 and a reference image 1602, and a second difference image 1604 is generated from the first difference image 1603. Note that, flare occurs in the read image 1601, and a diagonally shaded area 1611 of the first difference image 1603 is an area corresponding to an edge area of the reference image 1602. In the example of FIG. 15, the flare occurs on the left of the middle of the read image 1601, so that the middle of the second difference image 1604 is positive (white) on its middle left side. In the case of the flare, as described above, only the positive continuous line defect or the negative continuous line defect aggregates.

Therefore, when the ratio of a second pixel number relative to a first pixel number is equal to or more than a first value in a pixel column and there is another pixel column in which the ratio of a first pixel number relative to a second pixel number is equal to or more than the first value within a predetermined distance in the second direction, or when the ratio of a first pixel number relative to a second pixel number is equal to or more than the first value in a pixel column and there is another pixel column in which the ratio of a second pixel number relative to a first pixel number is equal to or more than the first value within the predetermined distance in the second direction, the determiner 216 determines that there is a line defect constituted of a pixel column. This makes it possible to prevent detection of flare as a line defect.

The modification example 2 assumes that the predetermined distance is three pixels, but is not limited thereto.

Note that, when an edge is blurred on one side of a line defect, a positive continuous line defect and a negative continuous line defect may not adjoin, in contrast to the second difference image 1504. Thus, when searching for a negative continuous line defect adjoining to a positive continuous line defect or searching for a positive continuous line defect adjoining to a negative continuous line defect, the line defect may be determined using a second value into which the first value (X) is modified.

That is, when the ratio of a second pixel number relative to a first pixel number is equal to or more than the first value in a pixel column and there is another pixel column in which the ratio of a first pixel number relative to a second pixel number is equal to or more than the second value, which is less than the first value, within a predetermined distance in the second direction, or when the ratio of a first pixel number relative to a second pixel number is equal to or more than the first value in a pixel column and there is another pixel column in which the ratio of a second pixel number relative to a first pixel number is equal to or more than the second value within the predetermined distance in the second direction, the determiner 216 may determine that there is a line defect constituted of a pixel column.

Modification Example 3

The above-described embodiment takes a case when the first value (X) is a fixed value as an example, but the first value (X) may be adjustable. For example, the first value (X) may be adjusted based on a noise occurrence situation in a read image. In this case, the determiner 216 may determine the first value based on a noise occurrence situation in an area of a read image corresponding to a flat area of a reference image. More specifically, the determiner 216 may calculate a noise occurrence situation from a variance in an area of a read image corresponding to a flat area of a reference image, and decrease the first value (X) when noise occurs with high frequency, while increase the first value (X) when noise occurs with low frequency.

Modification Example 4

In the above-described embodiment, a first pixel number (the number of positive pixels) and a second pixel number (the number of negative pixels) may be calculated by threshold processing, in order to adjust the detection strength of a line defect.

To be more specific, a first pixel number may be the number of pixels the pixel values of which are more than a first threshold value and the absolute values of the pixel values of which are more than a second threshold value. A second pixel number may be the number of pixels the pixel values of which are less than the first threshold value and the absolute values of the pixel values of which are more than the second threshold value.

Figure 16:
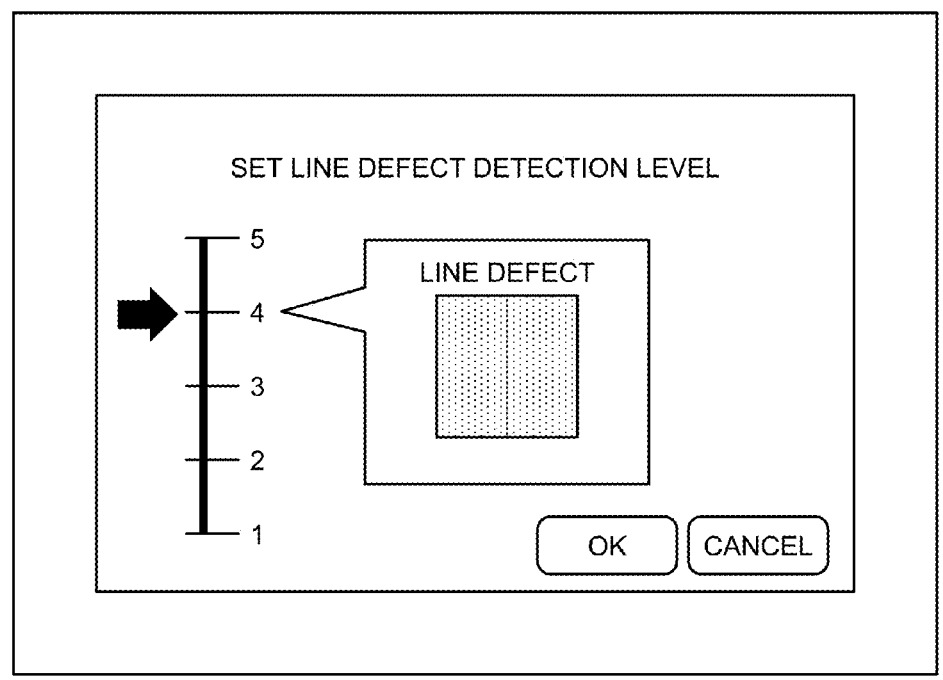
FIG. 16 is a drawing showing an example of a detection level setting screen according to a modification example 4.

Note that, the second threshold value may be set based on an external input, and, for example, may be set by an examiner from a detection level setting screen as shown in FIG. 16.

Modification Example 5

In the above-described embodiment, a detection target image may be a read image. The calculator 215 may set an area of a second difference image corresponding to a flat area of a reference image as a detection target area.

Modification Example 6

In the above-described embodiment, in order to detect a line defect that has occurred in an area corresponding to a picture area, each of a reference image and a read image may be a detection target image. A line defect may be determined by a comparison between a line defect determination result in a detection target area of a second difference image generated from the detection target image being the reference image and a line defect determination result in a detection target area of a second difference image generated from the detection target image being the read image. When there is a line defect in both of the detection target areas, the line defect is a pattern of an image. When there is a line defect only in the detection target area based on the read image, the line defect is determined to be a line defect.

In this case, the second difference image generator 214 may generate a second difference image for each of a detection target image being a reference image and a detection target image being a read image. The calculator 215 may calculate first and second pixel numbers of each pixel column in each of a detection target area in the second difference image generated from the detection target image being the reference image and a detection target area in the second difference image generated from the detection target image being the read image. The determiner 216 may determine whether there is a line defect, based on the ratio between the first pixel number and the second pixel number of each pixel column in each of the detection target area of the second difference image generated from the detection target image being the reference image and the detection target area of the second difference image generated from the detection target image being the read image.

Note that, a line defect determination of the reference image may be performed with taking advantage of a line defect determination result of the read image, e.g., only in an area that has been determined to be a line defect. This serves to reduce throughput and enhance speed.

That is to say, the calculator 215 calculates first and second pixel numbers of each pixel column in a detection target area of a second difference image generated from a detection target image being a read image. The determiner 216 performs a first determination to determine whether there is a line defect in the detection target area based on the ratio between the first and second pixel numbers of each pixel column.

When there is a line defect as a result of the first determination, the calculator 215 may calculate first and second pixel numbers of each pixel column in a detection target area of a second difference image generated from a detection target image being a reference image. The determiner 216 may perform a second determination to determine whether there is a line defect in the detection target area based on the ratio between the first and second pixel numbers of each pixel column. The determiner 216 may determine whether there is a line defect in the detection target area based on the results of the first and second determinations.

Modification Example 7

In the above-described embodiment, when the edge of a line defect is blurred, there may be a case where the density relation between adjoining pixels is not uniform and this causes a failure in detection of the line defect. Therefore, a difference value may be calculated between pixels a predetermined number of pixels away in the first direction, instead of between adjoining pixels, in order to obtain the preferable density relation with circumventing the blurred edge.

The predetermined number of pixels may be a constant obtained from experience. However, for example, a line defect may be detected slightly excessively using a small first value (X), the degree of blurriness of an edge in the detected line defect may be calculated from the distribution of a line in its width direction, and a reexamination may be performed to a line defect detection portion by setting a distance that can skip the edge as a distance between pixels.

Programs

Programs executed by the examination devices according to the above-described embodiment and the modification examples are provided in the form of installable or executable files in a state of being stored in computer-readable media such as CD-ROMs, CD-Rs, memory cards, DVDs (Digital Versatile Discs), and flexible disks (FDs).

The programs executed by the examination devices according to the above-described embodiment and the modification examples may be stored in computers connected through networks such as the Internet, and downloaded through the networks. The programs executed by the examination devices according to the above-described embodiment and the modification examples may be provided or distributed through networks such as the Internet. The programs executed by the examination devices according to the above-described embodiment and the modification examples may be installed in advance in ROMs and the like.

The programs executed by the examination devices according to the above-described embodiment and the modification examples have modular composition to realize each of the above-described components on computers. As actual hardware, for example, CPUs load the programs from ROMs to RAMS and execute the programs, to realize each of the above components on computers.

The present invention provides the effect of improving line defect detection accuracy.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An examination device comprising:
a reference image obtaining unit configured to obtain a reference image that is a reference of an examination of a printed matter;
a read image obtaining unit configured to obtain a read image obtained by reading the printed matter;
a first difference image generator configured to generate a first difference image that represents a difference between the reference image and the read image;
a second difference image generator configured to
calculate a difference value in pixel values between each pixel constituting a detection target image, from which a line defect is to be detected, and a pixel located at a position away from the each pixel by a predetermined number of pixels in a first direction, the detection target image being at least one of the reference image, the read image, and the first difference image, and
generate a second difference image constituted of the calculated difference values as pixel values;
a calculator configured to calculate a first pixel number being the number of pixels of which pixel values are more than a first threshold value, and a second pixel number being the number of pixels of which pixel values are less than the first threshold value, out of a plurality of pixels constituting each of a plurality of pixel columns that constitute a detection target area from which a line defect is to be detected in the second difference image and extend in a second direction orthogonal to the first direction; and
a determiner configured to determine whether there is a line defect constituted of one or more of the pixel columns in the detection target area, based on a ratio between the first pixel number and the second pixel number of each of the pixel columns.

2. The examination device according to claim 1, wherein the predetermined number of pixels is 1, and
the pixel located at the position away from the each pixel by the predetermined number of pixels is an adjoining pixel.

3. The examination device according to claim 1, further comprising a specifying unit configured to specify an edge area from the reference image, wherein
when any pixel used for calculating the difference value corresponds to a pixel constituting the edge area, the second difference image generator sets the difference value as the first threshold value.

4. The examination device according to claim 1, wherein when the ratio of the second pixel number relative to the first pixel number is equal to or more than a first value in a pixel column, or when the ratio of the first pixel number relative to the second pixel number is equal to or more than the first value in a pixel column, the determiner determines that there is a line defect constituted of the pixel column.

5. The examination device according to claim 1, wherein when the ratio of the second pixel number relative to the first pixel number is equal to or more than a first value in a pixel column and there is another pixel column in which the ratio of the first pixel number relative to the second pixel number is equal to or more than the first value within a predetermined distance in the second direction, or when the ratio of the first pixel number relative to the second pixel number is equal to or more than the first value in a pixel column and there is another pixel column in which the ratio of the second pixel number relative to the first pixel number is equal to or more than the first value within the predetermined distance in the second direction, the determiner determines that there is a line defect constituted of the pixel column.

6. The examination device according to claim 1, wherein when the ratio of the second pixel number relative to the first pixel number is equal to or more than a first value in a pixel column and there is another pixel column in which the ratio of the first pixel number relative to the second pixel number is equal to or more than a second value that is less than the first value within a predetermined distance in the second direction, or when the ratio of the first pixel number relative to the second pixel number is equal to or more than the first value in a pixel column and there is another pixel column in which the ratio of the second pixel number relative to the first pixel number is equal to or more than the second value within the predetermined distance in the second direction, the determiner determines that there is a line defect constituted of the pixel column.

7. The examination device according to claim 4, further comprising a specifying unit configured to specify a flat area in which density variations of pixels are within a predetermine range, from the reference image, wherein
the determiner determines the first value based on a noise occurrence situation in an area of the read image corresponding to the flat area.

8. The examination device according to claim 1, wherein the difference value is a difference value with a sign,
the first threshold value is 0,
the first pixel number is the number of pixels of which pixel values are more than the first threshold value, and of which absolute values of the pixel values are more than a second threshold value, and
the second pixel number is the number of pixels of which pixel values are less than the first threshold value, and of which absolute values of the pixel values are more than the second threshold value.

9. The examination device according to claim 8, wherein the second threshold value is set based on an external input.

10. The examination device according to claim 1, wherein the detection target image is the first difference image.

11. The examination device according to claim 1, wherein the detection target image is the read image,
the examination device further comprises an specifying unit configured to specify a flat area in which density variations of pixels are within a predetermine range, from the reference image, and
the calculator sets an area of the second difference image corresponding to the flat area as the detection target area.

12. The examination device according to claim 1, wherein each of the reference image and the read image is the detection target image,
the second difference image generator generates the second difference image for each of the detection target image being the reference image and the detection target image being the read image,
the calculator calculates the first pixel number and the second pixel number of each of the pixel columns in each of the detection target area of the second difference image generated from the detection target image being the reference image and the detection target area of the second difference image generated from the detection target image being the read image, and
the determiner determines whether there is a line defect in the detection target area based on a ratio between the first pixel number and the second pixel number of each of the pixel columns in each of the detection target area of the second difference image generated from the detection target image being the reference image and the detection target area of the second difference image generated from the detection target image being the read image.

13. The examination device according to claim 1, wherein each of the reference image and the read image is the detection target image,
the second difference image generator generates the second difference image for each of the detection target image being the reference image and the detection target image being the read image,
the calculator calculates the first pixel number and the second pixel number of each of the pixel columns in the detection target area of the second difference image generated from the detection target image being the read image,
the determiner performs a first determination to determine whether there is a line defect in the detection target area based on a ratio between the first pixel number and the second pixel number of each of the pixel columns,
when there is a line defect, the calculator calculates the first pixel number and the second pixel number of each of the pixel columns in the detection target area of the second difference image generated from the detection target image being the reference image; and
the determiner performs a second determination to determine whether there is a line defect in the detection target area based on a ratio between the first pixel number and the second pixel number of each of the pixel columns, and determines whether there is a line defect in the detection target area based on results of the first determination and the second determination.

14. An examination method comprising:
obtaining a reference image that is a reference of an examination of a printed matter;
obtaining a read image obtained by reading the printed matter;
generating a first difference image that represents a difference between the reference image and the read image;
calculating a difference value in pixel values between each pixel constituting a detection target image, from which a line defect is to be detected, and a pixel located at a position away from the each pixel by a predetermined number of pixels in a first direction, the detection target image being at least one of the reference image, the read image, and the first difference image;
generating a second difference image constituted of the calculated difference values as pixel values;
calculating a first pixel number being the number of pixels of which pixel values are more than a first threshold value, and a second pixel number being the number of pixels of which pixel values are less than the first threshold value, out of a plurality of pixels constituting each of a plurality of pixel columns that constitute a detection target area from which a line defect is to be detected in the second difference image and extend in a second direction orthogonal to the first direction; and
determining whether there is a line defect constituted of one or more of the pixel columns in the detection target area, based on a ratio between the first pixel number and the second pixel number of each of the pixel columns.

15. A computer program product comprising a non-transitory computer-readable medium including programmed instructions that cause a computer to execute:
obtaining a reference image that is a reference of an examination of a printed matter;
obtaining a read image obtained by reading the printed matter;
generating a first difference image that represents a difference between the reference image and the read image;
calculating a difference value in pixel values between each pixel constituting a detection target image, from which a line defect is to be detected, and a pixel located at a position away from the each pixel by a predetermined number of pixels in a first direction, the detection target image being at least one of the reference image, the read image, and the first difference image;
generating a second difference image constituted of the calculated difference values as pixel values;
calculating a first pixel number being the number of pixels of which pixel values are more than a first threshold value, and a second pixel number being the number of pixels of which pixel values are less than the first threshold value, out of a plurality of pixels constituting each of a plurality of pixel columns that constitute a detection target area from which a line defect is to be detected in the second difference image and extend in a second direction orthogonal to the first direction; and
a determination step of determining whether there is a line defect constituted of one or more of the pixel columns in the detection target area, based on a ratio between the first pixel number and the second pixel number of each of the pixel columns.

* * * * *